US012789624B2

(12) United States Patent
Imamura et al.

(10) Patent No.: US 12,789,624 B2
(45) Date of Patent: Nov. 10, 2026

(54) ELECTRIC VEHICLE

(71) Applicant: TOYOTA JIDOSHA KABUSHIKI KAISHA, Toyota (JP)

(72) Inventors: Tatsuya Imamura, Okazaki (JP); Yoichiro Isami, Mishima (JP); Taro Moteki, Zama (JP); Yukari Okamura, Gotemba (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 19/274,983

(22) Filed: Jul. 21, 2025

(65) Prior Publication Data

US 2026/0077648 A1 Mar. 19, 2026

(30) Foreign Application Priority Data

Sep. 17, 2024 (JP) ................................ 2024-160353

(51) Int. Cl.
*B60K 35/21* (2024.01)
*B60K 35/22* (2024.01)
(Continued)

(52) U.S. Cl.
CPC .......... *B60K 35/214* (2024.01); *B60K 35/213* (2024.01); *B60K 35/22* (2024.01);
(Continued)

(58) Field of Classification Search
CPC .. B60K 35/213; B60K 35/214; B60K 35/215; B60K 35/22; B60K 35/28; B60K 35/29; B60L 15/20; B60L 15/2054
See application file for complete search history.

(56) References Cited

U.S. PATENT DOCUMENTS

2022/0041070 A1* 2/2022 Isami ........................ B60K 1/00
2024/0209934 A1* 6/2024 Jahns .................. F16H 61/0213
2025/0060034 A1* 2/2025 Cho ........................ F16H 63/42

FOREIGN PATENT DOCUMENTS

| | | | |
|---|---|---|---|
| JP | 2002-362460 | A | 12/2002 |
| JP | 2016-170008 | A | 9/2016 |
| JP | 7298566 | B2 | 6/2023 |

OTHER PUBLICATIONS

Website article: https://tesmen.com/blogs/tesmen-blogs/what-does-ol-mean-on-a-smart-digital-multimeter (Year: 2023).*

* cited by examiner

*Primary Examiner* — Fadey S. Jabr
*Assistant Examiner* — Mario C Gonzalez
(74) *Attorney, Agent, or Firm* — Sughrue Mion, PLLC

(57) ABSTRACT

The electric vehicle is adapted to change the torque output by an electric motor to simulate the rotational speed-torque characteristic of a virtual rotating machine in response to driver operation. The electric vehicle comprises a display device and a control device. The control device displays on a display screen of the display device an indicator representing a virtual rotational speed of the virtual rotating machine. In a rotational speed range below the redline rotational speed of the virtual rotating machine, the control device continuously or discretely moves the indicator within a first display area of the display screen according to the magnitude of the virtual rotational speed. In a rotational speed range higher than the redline rotational speed, the control device moves the indicator to a second display area outside the first display area, and limits the movement of the indicator within the second display area.

15 Claims, 15 Drawing Sheets

(51) Int. Cl.
*B60K 35/28* (2024.01)
*B60K 35/29* (2024.01)
*B60L 15/20* (2006.01)

(52) U.S. Cl.
CPC .............. *B60K 35/28* (2024.01); *B60K 35/29* (2024.01); *B60L 15/2054* (2013.01); *B60K 2360/188* (2024.01); *B60L 2240/423* (2013.01); *B60L 2250/16* (2013.01)

ELECTRIC VEHICLE

CROSS-REFERENCE TO RELATED APPLICATION

The present application claims priority under 35 U.S.C. § 119 to Japanese Patent Application No. 2024-160353, filed on Sep. 17, 2024, the contents of which are incorporated herein by reference in their entirety.

BACKGROUND

Field

The present disclosure relates to an electric vehicle having an electric motor as a power source, and more specifically, to an electric vehicle adapted to change a torque output by the electric motor to simulate rotational speed-torque characteristics of a virtual rotating machine in response to an operation input by a driver.

Background Art

JP7298566B discloses a technique that simulates a virtual engine and a virtual manual transmission by adding a shift lever and a clutch pedal to a battery electric vehicle (BEV), and controlling motor torque based on operation signals from these additional devices. In this conventional technique, to make the user aware of the operating state of the virtual engine, a virtual engine rotational speed calculated by multiplying the virtual propeller shaft axis rotational speed by a virtual gear ratio is displayed on a tachometer.

In a tachometer for a vehicle with a manual transmission and an internal combustion engine, the range of rotational speeds is set to accommodate the maximum rotational speed when the engine enters an over-rev state. Such specifications of the tachometer can also be applied to a tachometer that displays a virtual engine rotational speed. In this case, the tachometer displays a redline rotational speed, which is the upper limit of the virtual engine rotational speed. The driver operates the shift lever to prevent the virtual engine rotational speed from exceeding the redline rotational speed. However, due to shift errors or other reasons, an over-rev state may occur where the virtual engine rotational speed exceeds the redline rotational speed. The degree of acceleration of the virtual engine at this time depends on the combination of the virtual engine's rotational speed-torque characteristics and the gear ratio settings of the virtual manual transmission.

According to the above-mentioned conventional technique, it is possible to simulate virtual engines with various rotational speed-torque characteristics, as well as to simulate virtual manual transmissions with various gear ratio settings. However, depending on the combination thereof, the virtual engine rotational speed may significantly exceed the redline rotational speed. Therefore, the range from the redline rotational speed to the maximum rotational speed on the tachometer needs to be set as large as possible to the extent that can be anticipated.

According to the above-mentioned conventional technique, it is possible to select a setting in which the virtual engine rotational speed is less likely to exceed the redline rotational speed. In that case, the large range from the redline rotational speed to the maximum rotational speed becomes a wasted range, resulting in inefficient use of screen resources on the display screen where the tachometer is shown. Various information to be provided to the driver is displayed on the display screen. Therefore, it is desirable to utilize the screen resources of the display screen as effectively as possible.

As conventional technologies indicating the technical level at the time of filing in the technical field related to the present disclosure, JP2002-362460A and JP2016-170008A are exemplified.

SUMMARY

The present disclosure has been made in view of the above-described problems. One objective of the present disclosure is to provide, in an electric vehicle adapted to change the torque output by an electric motor so as to simulate the torque characteristics of a virtual rotating machine in response to operations by a driver, a clear display of the rotational state of the virtual rotating machine to the driver while minimizing waste of screen resources on the display screen.

The present disclosure provides an electric vehicle that achieves the aforementioned objective. According to one aspect of the present disclosure, the electric vehicle is adapted to change the torque output by an electric motor to simulate the rotational speed-torque characteristic of a virtual rotating machine in response to an operation input by a driver. The electric vehicle comprises a display device configured to display information to be given to the driver, and a control device configured to control the display screen of the display device. The control device displays on the display screen an indicator representing a virtual rotational speed of the virtual rotating machine. In a rotational speed range below the redline rotational speed of the virtual rotating machine, the control device continuously or discretely moves the indicator within a first display area of the display screen according to the magnitude of the virtual rotational speed. In a rotational speed range higher than the redline rotational speed, the control device moves the indicator to a second display area outside the first display area, and limits the movement of the indicator within the second display area regardless of the magnitude of the virtual rotational speed.

According to one aspect of the present disclosure, when the virtual rotational speed is in the rotational speed range below the redline rotational speed, the indicator is moved continuously or discretely within the first display area of the display screen according to the magnitude of the virtual rotational speed. The driver can easily understand the rotational state of the virtual rotating machine from such a movement of the indicator. Moreover, according to one aspect of the present disclosure, when the virtual rotational speed is in the rotational speed range higher than the redline rotational speed, the indicator is moved to the second display area outside the first display area, and its movement is restricted to that location regardless of the magnitude of the virtual rotational speed. The driver can easily understand from such a movement of the indicator that the virtual rotational speed exceeds the redline rotational speed. Moreover, this eliminates the need for a wide display area corresponding to a rotational speed greater than the redline rotational speed, thereby conserving screen resources of the display screen. As described above, according to one aspect of the present disclosure, it is possible to clearly show the rotational state of the virtual rotating machine to the driver while minimizing waste of screen resources on the display screen.

DETAILED DESCRIPTION

1. Vehicle Configuration

Figure 1:
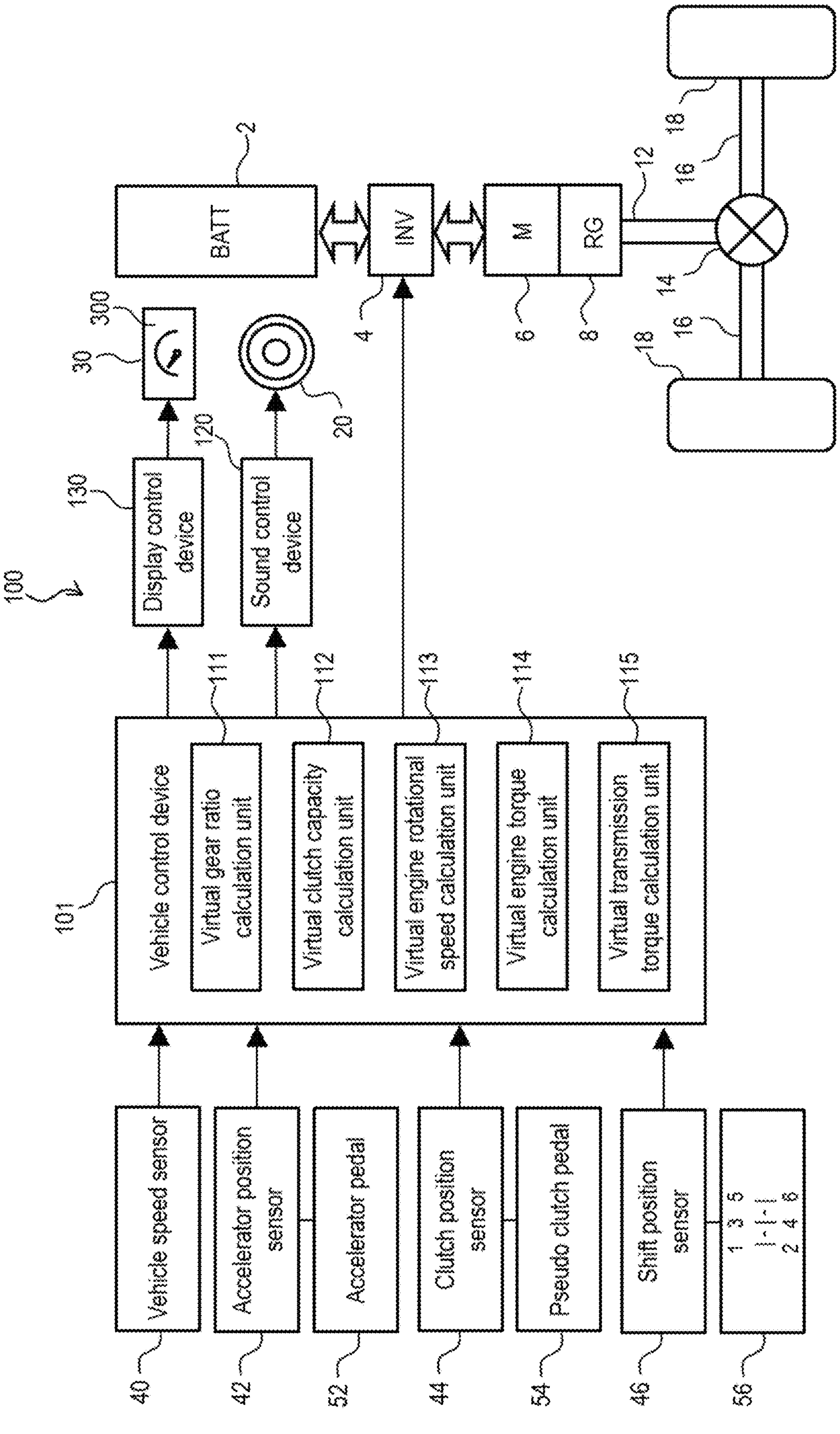
FIG. 1 is a diagram illustrating the configuration of an electric vehicle according to the present disclosure.

The vehicle according to the present disclosure is an electric vehicle adapted to change the torque output by an electric motor to simulate the rotational speed-torque characteristic of a virtual rotating machine in response to operations input by a driver. In the following description, an internal combustion engine (hereinafter simply referred to as an engine) is exemplified as a rotating machine for which the rotational speed-torque characteristic is simulated. The configuration of a vehicle 100 according to the present disclosure will be described below with reference to FIG. 1.

The vehicle 100 is equipped with an electric motor (M) 6 as a driving source for traveling. Additionally, the vehicle 100 is equipped with a battery (BATT) 2 and an inverter (INV) 4. The battery 2 stores electrical energy for driving the electric motor 6. In other words, the vehicle 100 is a battery electric vehicle (BEV) that runs on electrical energy stored in the battery 2. The electric motor 6 is, for example, a three-phase AC motor. The inverter 4 is, for example, a voltage-type inverter that controls the torque of the electric motor 6 through PWM control.

The output shaft of the electric motor 6 is connected to a reduction gear (RG) 8. The reduction gear 8 is connected to a differential gear 14 by a propeller shaft 12. The differential gear 14 is connected to left and right drive wheels 18 by left and right drive shafts 16. The drive wheels 18 may be either rear wheels or front wheels. However, the vehicle 100 may also be configured as an all-wheel drive vehicle. In that case, a center differential gear may be provided on the propeller shaft 12, and the driving torque divided by the center differential gear may be transmitted to both the front wheels and the rear wheels.

The vehicle 100 is equipped with a vehicle speed sensor 40. The vehicle speed sensor 40 is a sensor that outputs a signal corresponding to the traveling speed (hereinafter referred to as vehicle speed) of the vehicle 100. At least one of the wheel speed sensors, which are not shown in the figure, installed on each of the left and right front wheels and the left and right rear wheels is used as the vehicle speed sensor 40.

Furthermore, the vehicle 100 is equipped with an accelerator position sensor 42. The accelerator position sensor 42 is provided on the accelerator pedal 52 and is a sensor that outputs a signal corresponding to the operational amount of the accelerator pedal 52. The operation amount of the accelerator pedal 52 refers to the amount of depression of the accelerator pedal 52 by the driver, that is, the accelerator opening degree.

The accelerator pedal 52 is one of driving operation members used for driving the vehicle 100. In addition to the accelerator pedal 52, the driving operation members include a brake pedal (not shown). Separately from those driving operation members, the vehicle 100 is equipped with pseudo-shift operation members that simulate operation members used for shift operations in a manual transmission engine vehicle. The pseudo-shift operation members include a pseudo-clutch pedal 54 and a pseudo-shifter 56 described below.

The pseudo-clutch pedal 54 is a dummy that differs from a genuine clutch pedal. The pseudo-clutch pedal 54 has a structure similar to the clutch pedal equipped in conventional manual transmission engine vehicles. For example, the pseudo-clutch pedal 54 is equipped with a reaction force mechanism that generates a reaction force against depression by the driver. The position when no pressing force is applied is the start position of the pseudo-clutch pedal 54, and the position when it is depressed to the deepest point is the end position of the pseudo-clutch pedal 54. The driver can operate the pseudo-clutch pedal 54 from the start position to the end position against the reaction force from the reaction force mechanism.

The vehicle 100 is equipped with a clutch position sensor 44. The clutch position sensor 44 is provided on a pseudo-clutch pedal 54, and is a sensor that outputs a signal corresponding to the operation amount of the pseudo-clutch pedal 54. The operation amount of the pseudo-clutch pedal 54 refers to the depression amount of the pseudo-clutch pedal 54 by the driver, that is, the clutch pedal stroke.

The pseudo-shifter 56 is a dummy that differs from a genuine shifter. The pseudo-shifter 56 has a structure that resembles an H-pattern shifter equipped in conventional manual transmission engine vehicles. The pseudo-shifter 56 has a shift lever, and this lever can be moved along an H-pattern gate. Shift positions are assigned to each gate of an H-pattern shifter, which is an alternate-type shifter. However, since the vehicle 100 is not equipped with an actual manual transmission, the shift positions of the pseudo-shifter 56 are virtual shift positions. In the example shown in FIG. 1, the first gear, the second gear, the third gear, the fourth gear, the fifth gear, and the sixth gear are provided as the virtual shift positions. In a conventional manual transmission type engine vehicle, the first gear is a shift position having the largest gear ratio, and the gear ratio decreases in the order of the second gear, the third gear, the fourth gear, the fifth gear, and the sixth gear.

The vehicle 100 is equipped with a shift position sensor 46. The shift position sensor 46 is provided on the pseudo-shifter 56 and is a sensor that outputs a signal indicating the shift position selected by the pseudo-shifter 56. Furthermore, when the shift lever is not in any shift position, the shift position sensor 46 outputs a signal indicating a neutral position.

The vehicle 100 is equipped with a vehicle control device 101. Sensors and controlled devices mounted on the vehicle 100 are connected to the vehicle control device 101 via an in-vehicle network. The vehicle speed sensor 40, the accelerator position sensor 42, the clutch position sensor 44, and the shift position sensor 46 are examples of sensors mounted on the vehicle 100. The signals from these sensors 40, 42, 44, 46 are input to the vehicle control device 101.

Furthermore, a speaker 20 is provided in the cabin of the vehicle 100. Additionally, a display device 30 is provided on the instrument panel of the vehicle 100. The display device 30 includes, for example, a liquid crystal panel or an organic EL panel as a display screen 300. The vehicle 100 comprises a sound control device 120 that controls the sound of the speaker 20, and a display control device 130 that controls the display screen 300 of the display device 30. The sound control device 120 and the display control device 130 are each connected to the vehicle control device 101.

2. Vehicle Control Device

The vehicle control device 101 is typically an electronic control unit (ECU). The vehicle control device 101 may be a combination of multiple ECUs. The vehicle control device 101 comprises an interface, memory, and processor, which are not illustrated. An in-vehicle network is connected to the interface. The memory includes RAM for temporarily recording data and ROM for storing programs executable by the processor and various data related to the programs. The program consists of multiple instructions. The processor reads and executes programs and data from memory, and generates control signals based on signals acquired from each sensor. The vehicle control device 101 may include one or multiple processors. The one or multiple processors constitute processing circuitry.

A program stored in the memory of the vehicle control device 101 includes a program for operating the vehicle 100 as if it were a manual transmission engine vehicle. This program implements a vehicle model that models a virtual manual transmission engine vehicle (hereinafter referred to as a virtual vehicle). When the program is executed, the processor or group of processors of the control device 101 functions as a virtual gear ratio calculation unit 111, a virtual clutch capacity calculation unit 112, a virtual engine rotational speed calculation unit 113, a virtual engine torque calculation unit 114, and a virtual transmission torque calculation unit 115.

The virtual gear ratio calculation unit 111 acquires a signal from the shift position sensor 46. From the signal of the shift position sensor 46, a virtual shift position of the pseudo-shifter 58 is obtained. The virtual gear ratio calculation unit 111 calculates the virtual gear ratio of the vehicle 100 based on the virtual shift position using a transmission model described later, which is part of the vehicle model. The virtual gear ratio is the gear ratio of a manual transmission (hereinafter referred to as a virtual manual transmission) that is virtually realized by torque control of the electric motor 6 using a vehicle model.

The virtual clutch capacity calculation unit 112 acquires a signal from the clutch position sensor 44. The clutch pedal stroke of the pseudo-clutch pedal 54 is obtained from the signal of the clutch position sensor 44. The virtual clutch capacity calculation unit 112 calculates the virtual clutch capacity based on the clutch pedal stroke using a clutch model described later, which is part of the vehicle model. The virtual clutch capacity is the torque transmission capacity of a clutch (hereinafter referred to as a virtual clutch) that is virtually realized by torque control of the electric motor 6 using the vehicle model.

The virtual engine rotational speed calculation unit 113 acquires a signal from the vehicle speed sensor 40. The vehicle speed is obtained from the signal of the vehicle speed sensor 40. The virtual engine rotational speed calculation unit 113 calculates the virtual engine rotational speed based on the vehicle speed and the virtual transmission ratio according to a predetermined calculation formula. The virtual engine rotational speed is the rotational speed of an engine (hereinafter referred to as a virtual engine) that is virtually realized by torque control of the electric motor 6 using the vehicle model. When the virtual clutch is in a partially engaged state, the virtual engine rotational speed is calculated using the vehicle speed, virtual gear ratio, and virtual slip rate. The virtual slip rate is calculated using the virtual clutch capacity and the virtual engine torque described later.

The virtual engine torque calculation unit 114 acquires a signal from the accelerator position sensor 42. From the signal of the accelerator position sensor 42, the accelerator opening degree of the accelerator pedal 52 is obtained. The virtual engine torque calculation unit 114 calculates the virtual engine torque based on the virtual engine rotational speed and the accelerator opening degree using the engine model described later, which is part of the vehicle model. The virtual engine torque is the torque output from the virtual engine.

The virtual transmission torque calculation unit 115 calculates a virtual transmission torque using the virtual engine torque, virtual clutch capacity, and virtual gear ratio. The virtual transmission torque is the torque output from the virtual manual transmission. The virtual transmission torque is the product of the virtual clutch torque input from the virtual clutch and the gear ratio, where the virtual clutch torque is the smaller of the virtual engine torque and the virtual clutch capacity. In other words, when the virtual engine torque is smaller than the virtual clutch capacity, the virtual clutch torque becomes equal to the virtual engine torque. On the other hand, when the virtual engine torque is larger than the virtual clutch capacity, the virtual clutch torque is limited to the virtual clutch capacity.

The vehicle control device 101 controls the inverter 4 to change the torque output by the electric motor 6 according to the virtual transmission torque. The virtual transmission torque changes discontinuously in response to the switching of the virtual gear ratio. This discontinuous change in the virtual transmission torque changes the behavior of the vehicle 100, simulating the characteristics of a vehicle equipped with a manual transmission.

3. Vehicle Model

Figure 2:
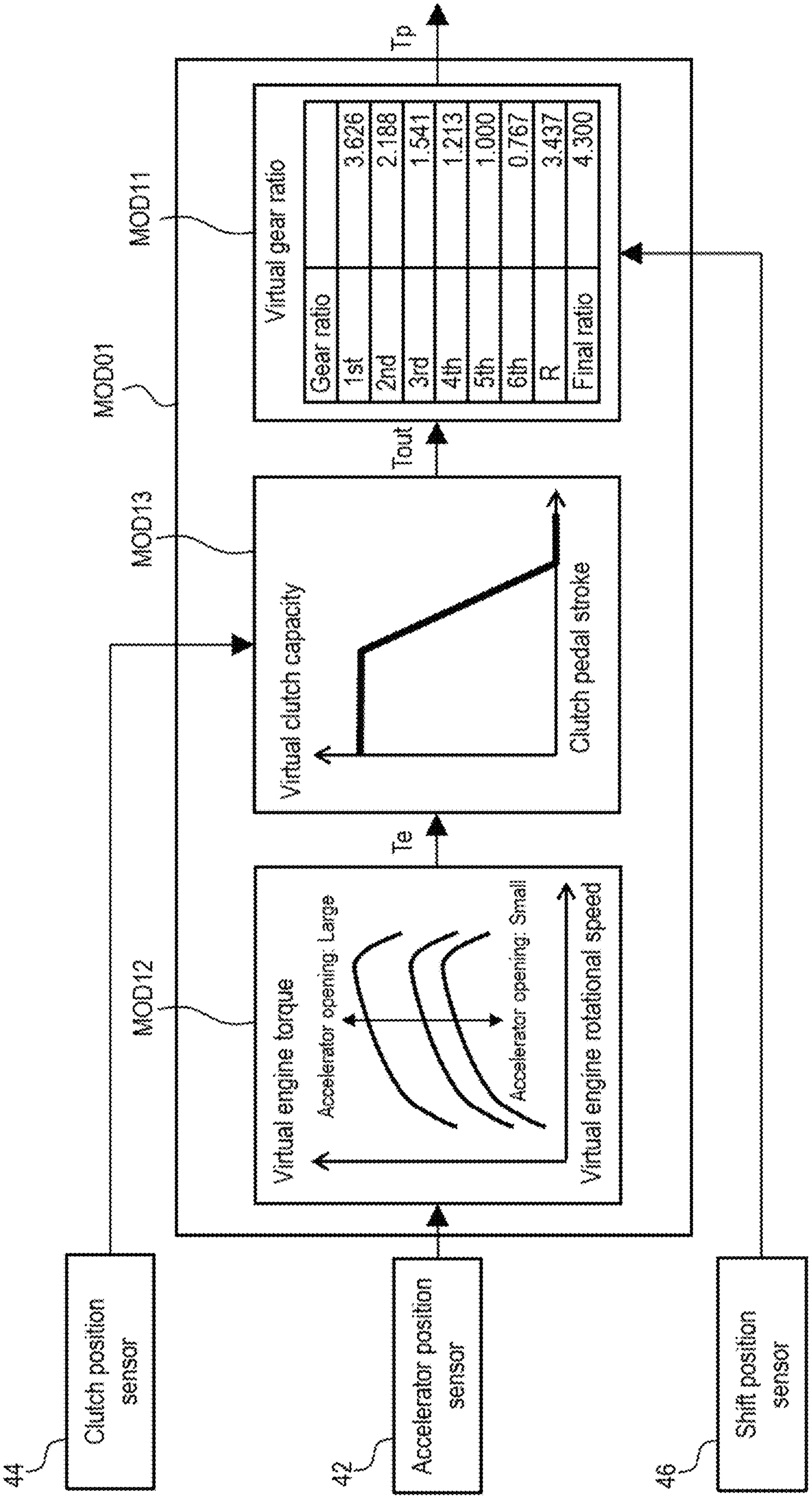
FIG. 2 is a diagram illustrating a vehicle model used in the control device of the electric vehicle shown in FIG. 1.

Here, the vehicle model of the virtual vehicle used by the vehicle control device 101 will be described with reference to FIG. 2. As shown in FIG. 2, the vehicle model MOD01 is composed of a transmission model MOD11, an engine model MOD12, and a clutch model MOD13. In the transmission model MOD11, a virtual manual transmission is modeled. In the engine model MOD12, a virtual engine is modeled. Furthermore, in the clutch model MOD13, a virtual clutch is modeled.

In the engine model MOD12, the relationship between the virtual engine rotational speed and the virtual engine torque is defined for each accelerator opening degree. The rotational speed-torque characteristics of engine model MOD12 can be set to characteristics assumed for a gasoline engine or characteristics assumed for a diesel engine. Additionally, the characteristics can be set to those assumed for a naturally aspirated engine or those assumed for a turbocharged engine. The virtual engine torque Te calculated by the engine model MOD12 is input to the clutch model MOD13. Moreover, when the virtual engine rotational speed decreases to or below a predetermined engine stall speed, the virtual engine torque is set to zero after an extremely short fluctuation, and the virtual engine rotational speed is also reduced to zero.

In the clutch model MOD13, a virtual clutch capacity is assigned corresponding to the clutch pedal stroke. The clutch pedal stroke is 0% at the starting position of the pseudo-clutch pedal 54, and becomes 100% at the end position of the pseudo-clutch pedal 54. When the clutch pedal stroke is 100%, the virtual clutch capacity is zero. At this time, in the clutch model MOD13, the virtual clutch is fully released, and the transmission of the virtual engine torque from the virtual engine to the virtual manual transmission is interrupted. As the clutch pedal stroke is returned from the 100% state, the state of the virtual clutch changes from a disengaged state to a half-engaged state at the clutch meet point. As a result, the virtual clutch capacity begins to increase, and accordingly, the transmission of the virtual engine torque from the virtual engine to the virtual manual transmission starts. Then, when the virtual clutch capacity becomes equal to or greater than the virtual engine torque, the state of the virtual clutch becomes engaged, and all of the virtual engine torque output from the virtual engine is input to the virtual manual transmission.

In the transmission model MOD11, a virtual gear ratio is set for each virtual shift position. The largest virtual gear ratio is set for the first gear, and the virtual gear ratios are progressively reduced for the second, third, fourth, fifth, and sixth gears. The virtual transmission torque Tp is calculated using the virtual gear ratio calculated by the transmission model MOD11 and the virtual clutch torque Tout input from the clutch model MOD13. The virtual clutch torque Tout is zero when the clutch pedal stroke is at or above the clutch meet point, and when the clutch pedal stroke becomes smaller than the clutch meet point, it increases from zero to the virtual engine torque Te in accordance with the decrease in the clutch pedal stroke.

4. Sound Control Device

Returning to FIG. 1, the sound control device 120 will be described. The sound control device 120 is typically an ECU. The sound control device 120 may also be a combination of multiple ECUs. The sound control device 120 comprises an interface, memory, and processor, which are not shown in the figure. The vehicle control device 101 and speaker 20 are connected to the interface. The memory includes RAM for temporarily recording data and ROM for storing programs executable by the processor and various data related to the programs. The program is composed of multiple instructions. The sound control device 120 may comprise one or more processors. The one or more processors constitute processing circuitry.

The sound control device 120 generates pseudo-engine sound to be output from the speaker 20. The sound control device 120 calculates the sound pressure of the pseudo-engine sound using a sound pressure map and calculates the frequency of the pseudo-engine sound using a frequency map. In the sound pressure map, sound pressure data is set in relation to the virtual engine rotational speed such that the sound pressure increases as the virtual engine rotational speed increases. Additionally, the sound pressure data is set in relation to the virtual engine torque such that the sound pressure increases as the virtual engine torque increases. In the frequency map, frequency data is set in relation to the virtual engine rotational speed such that the frequency increases as the virtual engine rotational speed becomes higher. Therefore, the sound pressure and frequency of the pseudo-engine sound emitted from the speaker 20 change according to the driver's operation of the accelerator pedal 52, and also change with the operation of the pseudo-clutch pedal 54 and the operation of the pseudo-shifter 56. By listening to the pseudo-engine sound where the sound pressure and frequency change in this manner, the driver auditorily experiences a feeling sensation similar to driving a manual transmission engine vehicle.

5. Display Control Device

The display control device 130 is typically an ECU. The display control device 130 may be a combination of multiple ECUs. The display control device 130 comprises an interface, memory, and processor, which are not shown in the figure. The vehicle control device 101 and the display device 30 are connected to the interface. The memory includes RAM for temporarily recording data and ROM for storing programs executable by the processor and various data related to the programs. The program is composed of multiple instructions. The number of processors included in the display control device 130 may be one or multiple. The one or more processors constitute processing circuitry.

The display control device 130 acquires the virtual engine rotational speed calculated by the virtual engine rotational speed calculation unit 113. The display control device 130 displays various information including a virtual engine tachometer on the display screen 300 of the display device 30. The displayed content of the virtual engine tachometer changes according to the driver's operation of the accelerator pedal 52, and also changes with the operation of the pseudo-clutch pedal 54 and the operation of the pseudo-shifter 56. By observing the display of the virtual engine tachometer that changes in this manner, the driver visually experiences a feeling similar to driving a manual transmission engine vehicle. The screen configuration of the virtual engine tachometer displayed on the display device 30 is controlled by the display control device 130. The screen configuration of the virtual engine tachometer will be described in detail below.

6. Screen Configuration of Virtual Engine Tachometer

6-1. First Embodiment

Figure 3:
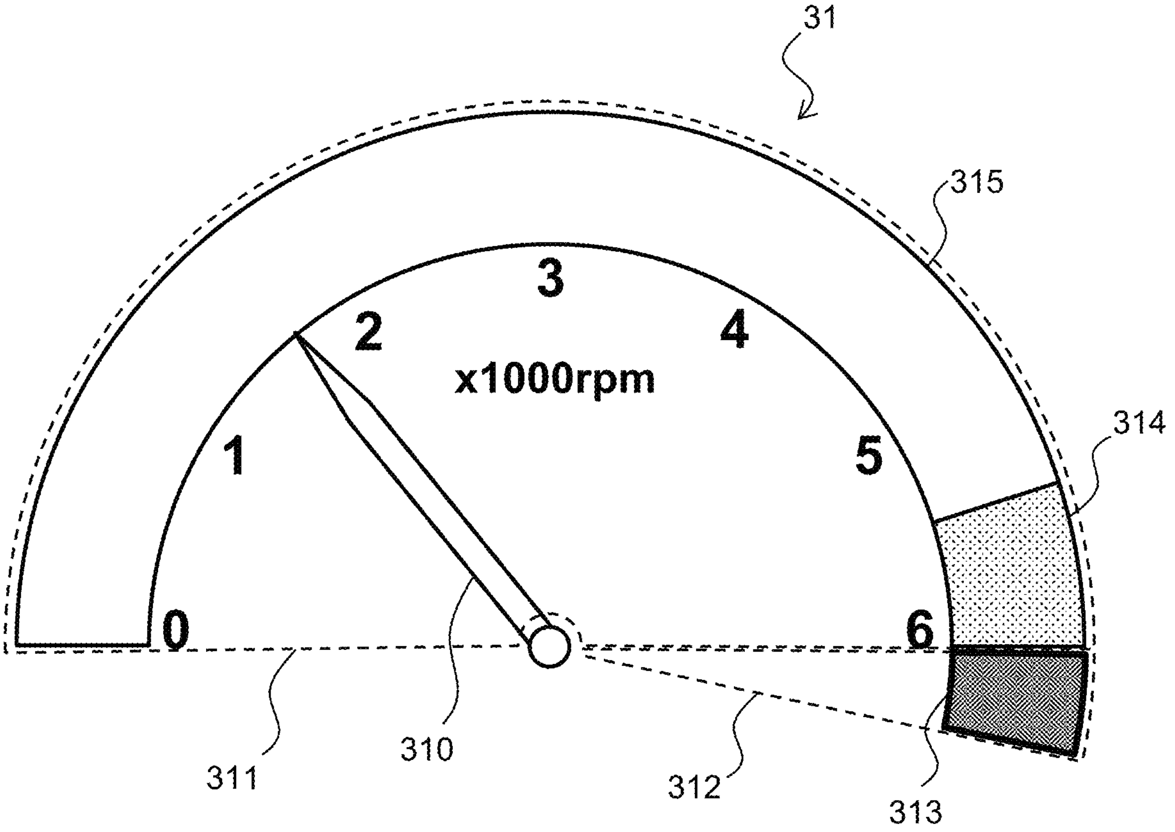
FIG. 3 is a diagram illustrating the screen configuration of a virtual engine tachometer according to the first embodiment.

FIG. 3 is a diagram illustrating the screen configuration of the virtual engine tachometer 31 according to the first embodiment. The virtual engine tachometer 31 has a needle 310 that rotates around a rotation center set within the screen.

The display area where the needle 310 rotates can be divided into a first display area 311 and a second display area 312. The first display area 311 is a wide-angle fan-shaped area corresponding to the rotation range from 0 rpm to the red line rotational speed. The red line rotational speed is also called the rev limit. Numerical values indicating the magnitude of rotational speed are displayed at regular intervals within the first display area 311. In the example shown in FIG. 3, 6000 rpm is the redline rotational speed, and values from 0 to 6 in units of 1000 rpm are displayed along the arc where the tip of the needle 310 rotates. However, the redline rotational speed is a virtually set upper limit of the rotational speed of the virtual engine, and does not necessarily correspond to the upper limit rotational speed of the electric motor 6.

In the first display area 311, two colored areas 314 and 315 are provided along the arc where the tip of the needle 310 rotates. The first colored area 314 is an area corresponding to the red zone of the rotational speed virtually set in the virtual engine. The red zone begins from a rotational speed slightly lower than the redline rotational speed. The second colored area 315 is an area corresponding to the engine rotational speed up to just before the red zone. The first colored area 314 and the second colored area 315 are visually distinguished from each other. Specifically, the second colored area 315 is white or yellow, while the first colored area 314 is red. However, it is not necessarily essential to distinguish between the first colored area 314 and the second colored area 315. The first colored area 314 and the second colored area 315 may be displayed as a single colored area combined.

The second display area 312 is provided adjacent to the first display area 311, bordered by the redline rotational speed. The second display area 312 is a narrow-angled fan-shaped area corresponding to the over-rev zone of the rotational speed. The over-rev zone is a rotational range higher than the redline rotational speed within the red zone. Unlike the first display area 311, the second display area 312 does not display numerical values indicating the magnitude of rotational speed. As described later, within the first display area 311, the rotation angle of the needle 310 changes continuously according to the magnitude of the virtual engine rotational speed. In contrast, within the second display area 312, the rotation angle of the needle 310 is fixed at a constant angle regardless of the magnitude of the virtual engine rotational speed.

The second display area 312 includes a light emission area 313 as a third display area. The light emission area 313 is provided adjacent to the first colored area 314. The light emission area 313 is an area where emphasis display is performed according to the position of the needle 310. When the needle 310 is within the first display area 311, nothing is displayed in the light emission area 313. However, when the needle 310 rotates to the second display area 312, the light emission area 313 brightly lights up. For example, the entire light emission area 313 may be illuminated in a darker red color and with a higher brightness than the first colored area 314.

Next, the screen transition of the virtual engine tachometer 31 having the above-mentioned screen configuration will be described using FIGS. 4A, 4B, and 4C.

Figure 4A:
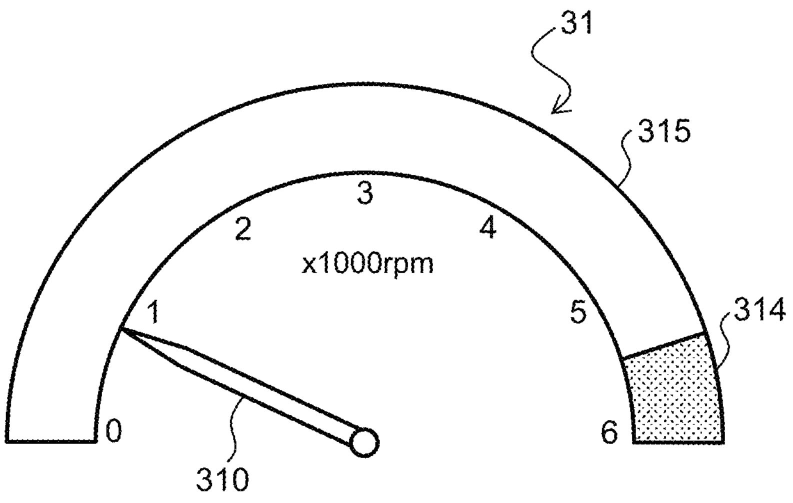
FIG. 4A is a diagram illustrating a screen of the virtual engine tachometer in an idle state according to the first embodiment.

FIG. 4A is a diagram illustrating the screen of the virtual engine tachometer 31 in an idle state. In the idle state, the needle 310 is maintained at a rotational angle near the idle rotational speed of the virtual engine. Subsequently, when the accelerator pedal 52 is pressed by the driver, the rotational angle of the needle 310 increases in accordance with the rise in the virtual engine rotational speed.

Figure 4B:
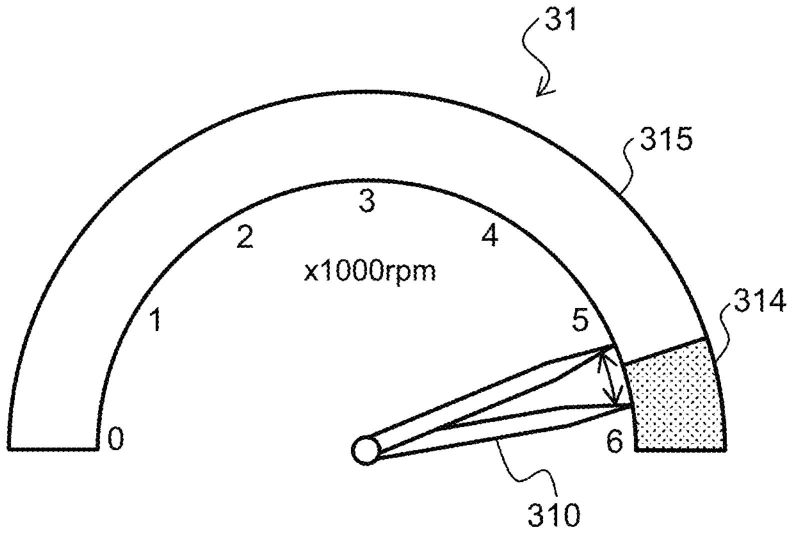
FIG. 4B is a diagram illustrating an example of image movement near the red zone of the virtual engine tachometer according to the first embodiment.

FIG. 4B is a diagram illustrating an example of image movement near the red zone of the virtual engine tachometer 31. As the driver fully depresses the accelerator pedal 52, the virtual engine rotational speed rises to the red zone. In this case, the vehicle control device 101 performs control so that the virtual engine rotational speed does not exceed the redline rotational speed. Specifically, when the virtual engine rotational speed enters the red zone, a computational process simulating fuel cut-off is performed, and when the virtual engine rotational speed decreases to the normal rotation range, a computational process simulating fuel re-injection is performed. As these computational processes are repeated alternately, the needle 310 oscillates between the first colored area 314 and the second colored area 315.

Figure 4C:
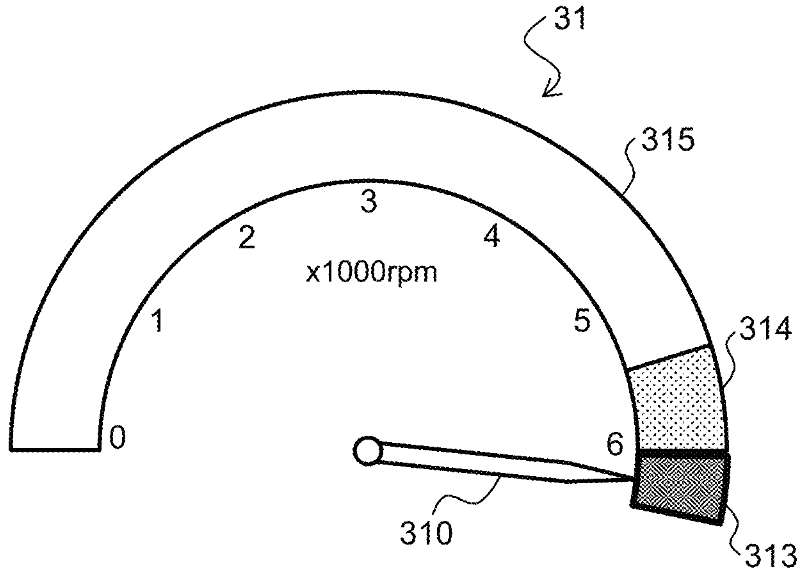
FIG. 4C is a diagram illustrating a screen of the virtual engine tachometer in an over-rev state according to the first embodiment.

FIG. 4C is a diagram illustrating the screen of the virtual engine tachometer 31 in an over-rev state. By merely depressing the accelerator pedal 52, the virtual engine rotational speed does not exceed the redline rotational speed due to the aforementioned control being in effect. However, depending on the shift position selected by the driver's shifting operation, specifically a downshift operation, the virtual engine rotational speed may exceed the redline rotational speed. This is also common in vehicles equipped with an actual transmission. With a momentary-type shifter such as a paddle shifter, a shift command that would cause the engine rotational speed to exceed the redline rotational speed can be rejected. However, in the case of an alternate-type shifter such as an H-pattern shifter, the gear ratio is mechanically determined by the selected shift position, and the engine rotational speed after the gear shift operation is determined by this gear ratio and the vehicle speed. As a result, an over-rev state may occur in which the engine rotational speed exceeds the redline rotational speed.

If the virtual engine rotational speed exceeds the redline rotational speed, the needle 310 of the virtual engine tachometer 31 is rotated to a predetermined position beyond the redline rotational speed and fixed at that position. At the same time, the light emission area 313, which had not been displayed on the screen until then, is illuminated.

By seeing such movement of the needle 310 and illumination of the light emission area 313, the driver can easily understand that the virtual engine rotational speed has entered the over-rev zone. Moreover, by not numerically displaying the magnitude of rotational speed in the over-rev zone, it is unnecessary to secure a wide display area corresponding to the over-rev zone, thereby conserving screen resources of the display screen. In other words, the virtual engine tachometer 31 allows the driver to easily understand the rotational state of the virtual engine while minimizing the waste of screen resources on the display screen.

Next, the switching of the screen configuration of the virtual engine tachometer 31 according to the specifications of the virtual vehicle will be described. The redline rotational speed of the virtual engine is determined by the combination of the rotational speed-torque characteristics of the virtual engine and the gear ratio settings of the virtual manual transmission. Information regarding that combination is provided from the vehicle control device 101 to the display control device 130 as specification information related to the virtual vehicle's specifications. The display control device 130 changes the settings of the numerical display included in the first display area 311 according to the specification information provided from the vehicle control device 101.

Figure 5A:
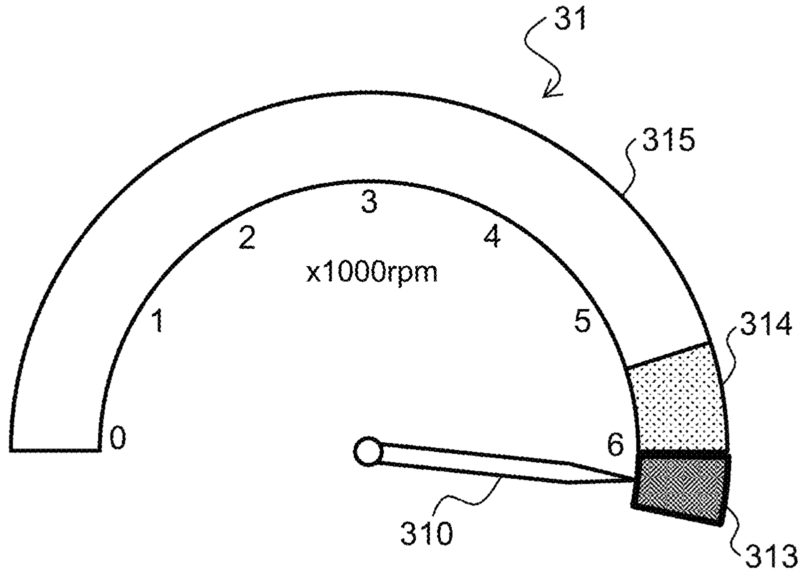
FIG. 5A is a diagram illustrating the screen configuration of the virtual engine tachometer according to the first embodiment when the virtual vehicle is a standard vehicle.
Figure 5B:
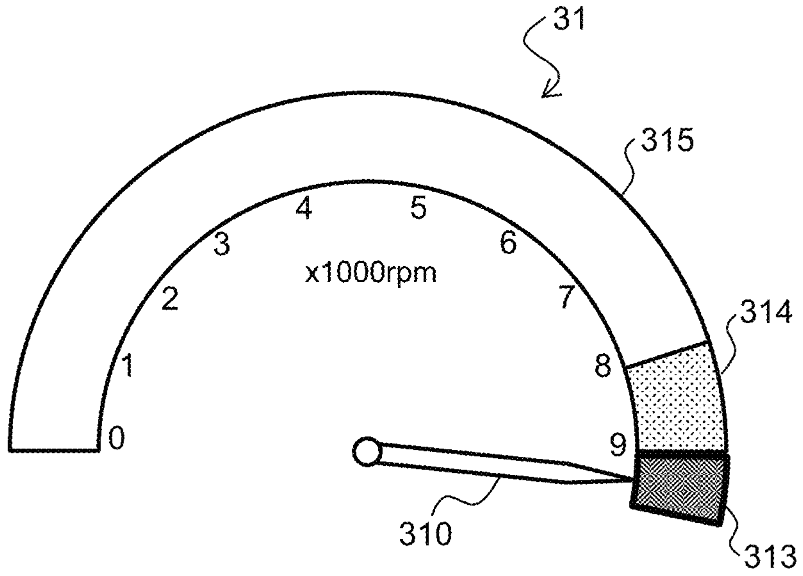
FIG. 5B is a diagram illustrating the screen configuration of the virtual engine tachometer according to the first embodiment when the virtual vehicle is a high-revolution type vehicle.
Figure 5C:
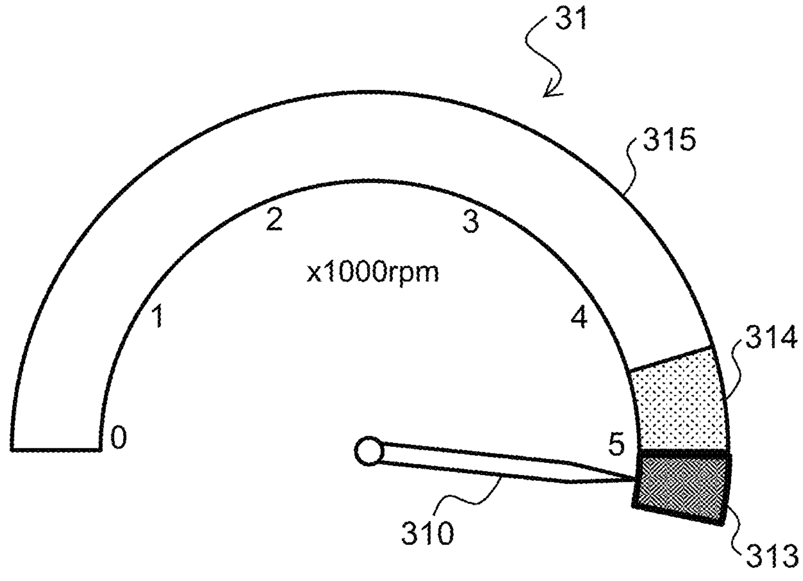
FIG. 5C is a diagram illustrating the screen configuration of the virtual engine tachometer according to the first embodiment when the virtual vehicle is a low-revolution type vehicle.

FIG. 5A is a diagram illustrating the screen configuration of the virtual engine tachometer 31 when the virtual vehicle is a standard vehicle. For the standard vehicle, for example, a gasoline engine vehicle with mild characteristics that can be easily handled by a typical driver is envisioned. FIG. 5B is a diagram illustrating the screen configuration of the virtual engine tachometer 31 when the virtual vehicle is a high-speed type vehicle. For the high-speed type vehicle, for example, a gasoline engine vehicle with peaky characteristics, such as a race car, is envisioned. FIG. 5C is a diagram illustrating the screen configuration of the virtual engine tachometer 31 when the virtual vehicle is a low-rpm type vehicle. For the low-rpm type vehicle, for example, a diesel engine vehicle with excellent fuel efficiency is envisioned. However, regardless of the virtual vehicle specifications, numerical values indicating the magnitude of rotational speed are not displayed in the over-rev zone, and the size of the light emission area 313 remains constant.

In a case where the driver can select a driving mode of the virtual vehicle, the display control device 130 may acquire the driving mode from the vehicle control device 101 and switch the settings of the numerical display included in the first display area 311 according to the driving mode. For example, when the driving mode selected by the driver is the normal mode, the screen configuration shown in FIG. 5A may be selected as the screen configuration for the virtual engine tachometer 31. When the driver selects the sport mode, the screen configuration of the virtual engine tachometer 31 may be switched to the screen configuration shown in FIG. 5B. When the driver selects the eco mode, the screen configuration of the virtual engine tachometer 31 may be switched to the screen configuration shown in FIG. 5C. However, regardless of the driving mode, no numerical values indicating the magnitude of rotational speed are displayed in the over-rev zone, and the size of the light emission area 313 remains constant.

Next, several variations of the screen configuration for the virtual engine tachometer 31 will be described.

Figure 6A:
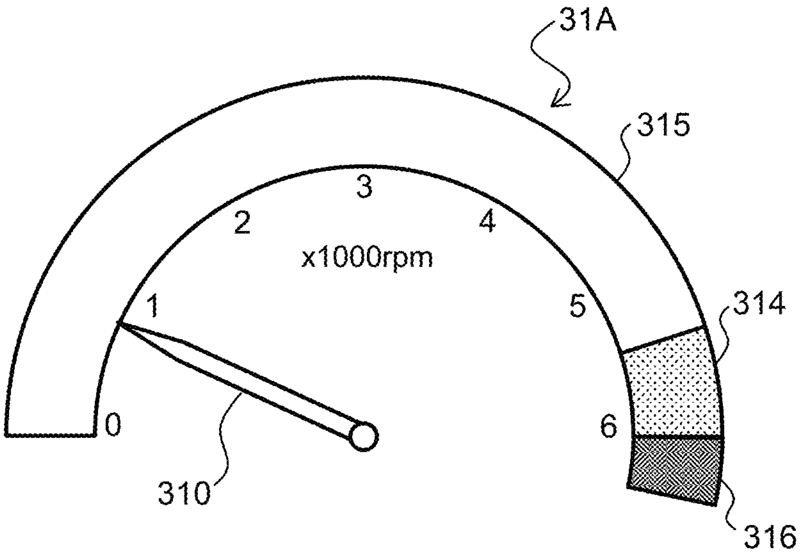
FIG. 6A is a diagram illustrating a screen of the first variation of the virtual engine tachometer in an idle state according to the first embodiment.
Figure 6B:
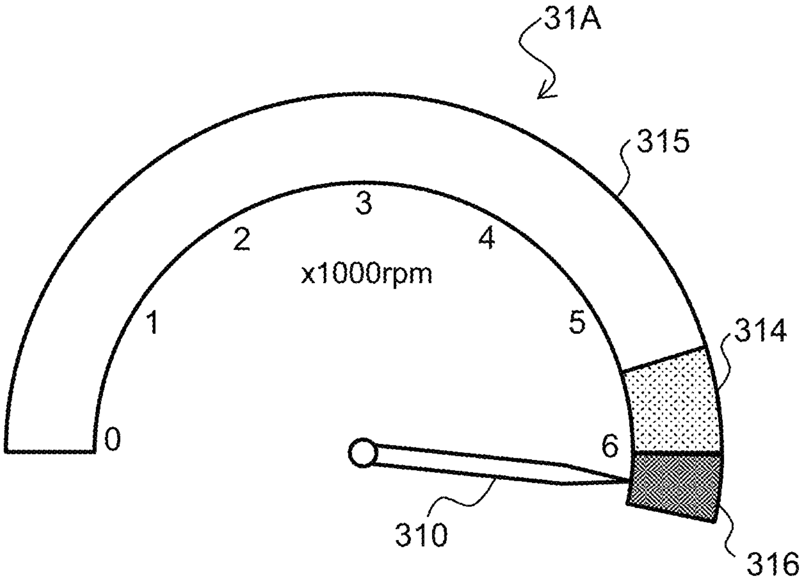
FIG. 6B is a diagram illustrating a screen of the first variation of the virtual engine tachometer in an over-rev state according to the first embodiment.

FIGS. 6A and 6B are diagrams illustrating the screen configuration of a virtual engine tachometer 31A, which is a first variation of the virtual engine tachometer 31. FIG. 6A shows the screen of the virtual engine tachometer 31A in an idle state, and FIG. 6B shows the screen of the virtual engine tachometer 31A in an over-rev state. In the first variation, instead of the light emission area 313 of the virtual engine tachometer 31, a third colored area 316 corresponding to the over-rev zone is provided. The light emission area 313 is switched between display and non-display according to the position of the needle 310, whereas the third colored area 316 is constantly displayed in a predetermined color. For example, the third colored area 316 may be a darker red than the first colored area 314 to make it visually distinguishable from the first colored area 314.

Figure 7A:
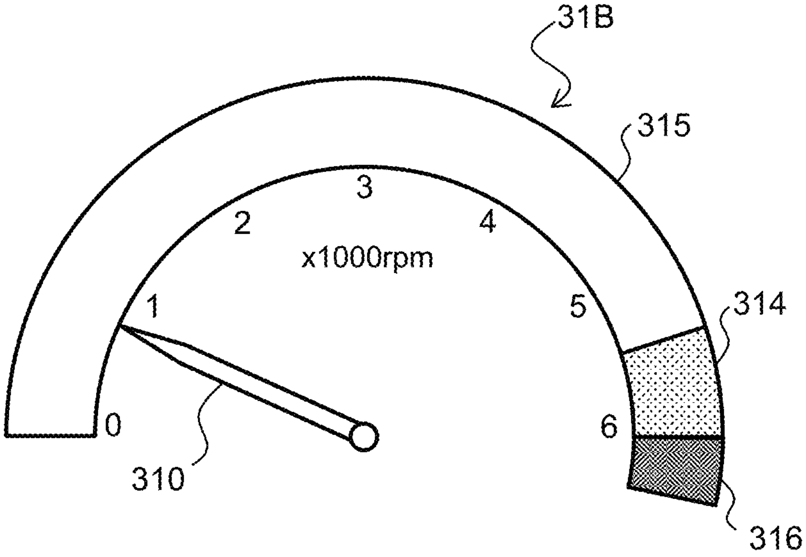
FIG. 7A is a diagram illustrating a screen of the second variation of the virtual engine tachometer in an idle state according to the first embodiment.
Figure 7B:
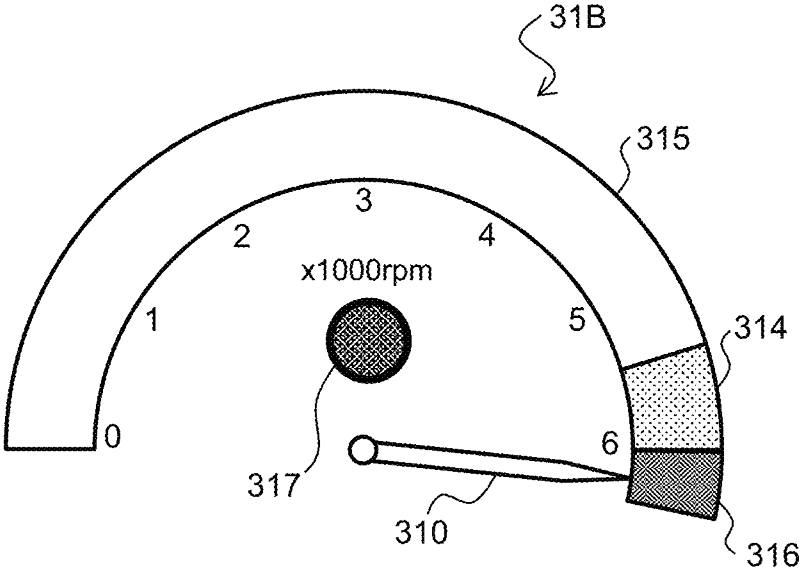
FIG. 7B is a diagram illustrating a screen of the second variation of the virtual engine tachometer in an over-rev state according to the first embodiment.

FIGS. 7A and 7B are diagrams illustrating the screen configuration of a virtual engine tachometer 31B, which is a second variation of the virtual engine tachometer 31. FIG. 7A shows a screen of the virtual engine tachometer 31B in an idle state, and FIG. 7B shows a screen of the virtual engine tachometer 31B in an over-rev state. In the second variation, based on the screen configuration of the first variation, a light emission area 317 as a third display area is provided within the rotation area (first display area 311 shown in FIG. 3) where the needle 310 rotates. The light emission area 317 is an area where emphasis display is performed according to the position of the needle 310. When the needle 310 is in the rotational speed range below the redline rotational speed, nothing is displayed in the light emission area 317. However, when the needle 310 rotates beyond the redline rotational speed to the third colored area 316, the light emission area 317 brightly illuminates, for example, in a deep red color. The shape of the light emission area 317 may be circular as shown in the figure, or it may have any arbitrary shape.

Figure 8A:
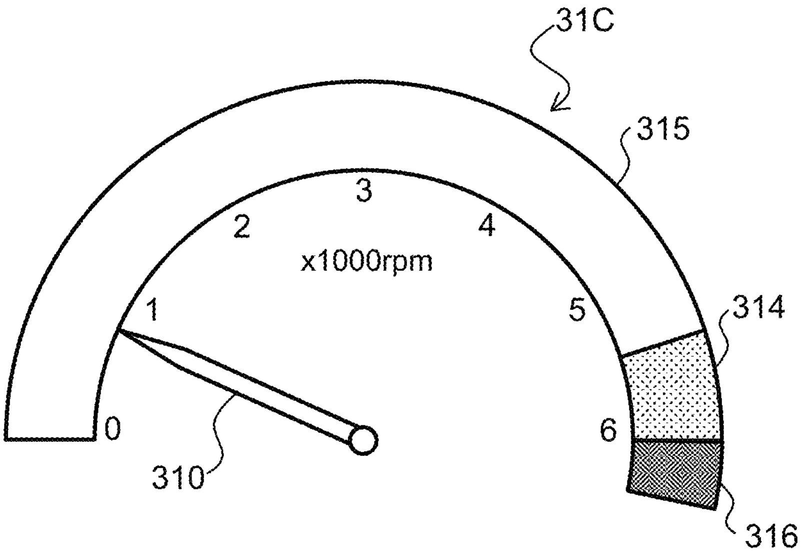
FIG. 8A is a diagram illustrating a screen of the third variation of the virtual engine tachometer in an idle state according to the first embodiment.
Figure 8B:
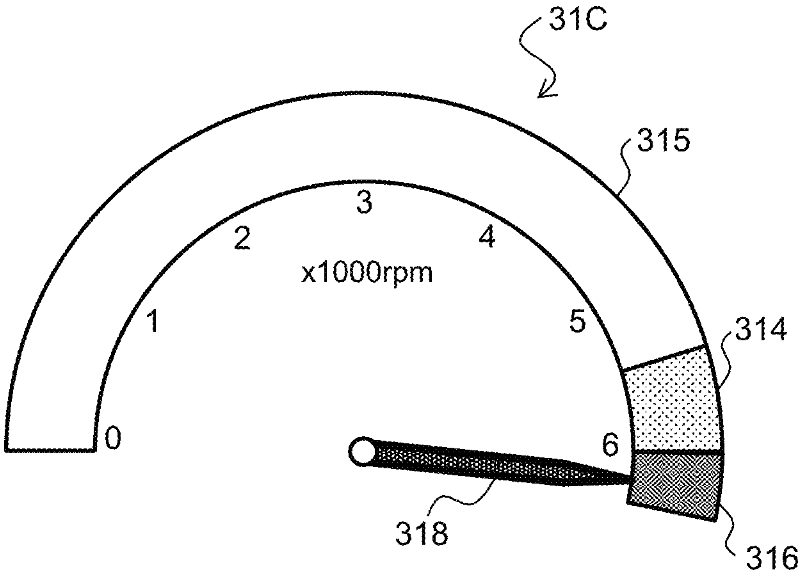
FIG. 8B is a diagram illustrating a screen of the third variation of the virtual engine tachometer in an over-rev state according to the first embodiment.

FIGS. 8A and 8B are diagrams illustrating the screen configuration of a virtual engine tachometer 31C, which is a third variation of the virtual engine tachometer 31. FIG. 8A shows the screen of the virtual engine tachometer 31C in an idle state, and FIG. 8B shows the screen of the virtual engine tachometer 31C in an over-rev state. In the third variation, based on the screen configuration of the first variation, the color of the needle 310, which is an icon, is switched. Specifically, when the virtual engine rotational speed is below the redline rotational speed, the needle 310 in a normal color such as white is displayed. However, when the virtual engine rotational speed exceeds the redline rotational speed, a needle 318 in a conspicuous color, serving as a third display area, is displayed instead of the needle 310. The needle 318 lights up brightly, for example, in a deep red color.

Figure 9A:
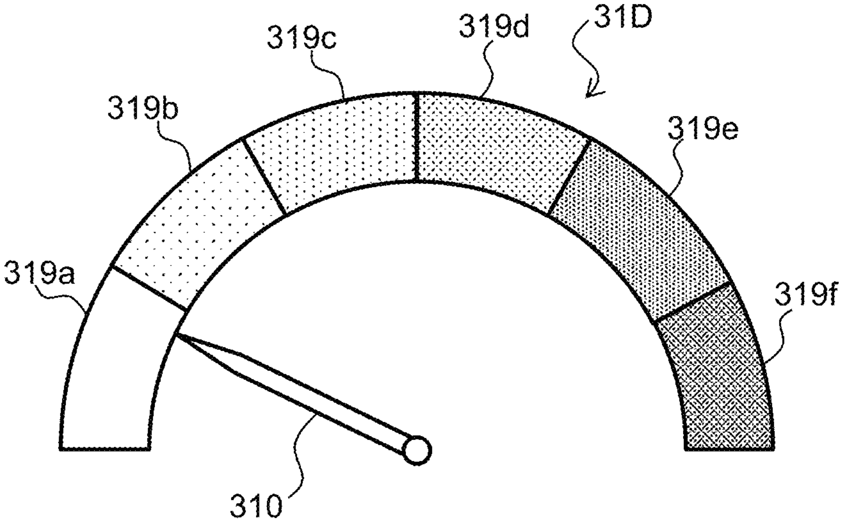
FIG. 9A is a diagram illustrating a screen of the fourth variation of the virtual engine tachometer in an idle state according to the first embodiment.
Figure 9B:
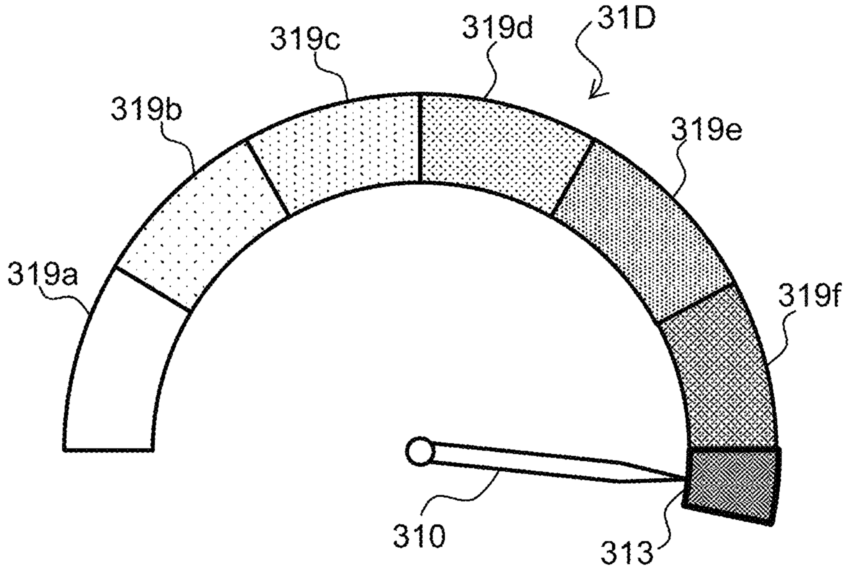
FIG. 9B is a diagram illustrating a screen of the fourth variation of the virtual engine tachometer in an over-rev state according to the first embodiment.

FIGS. 9A and 9B are diagrams illustrating the screen configuration of a virtual engine tachometer 31D, which is a fourth variation of the virtual engine tachometer 31. FIG. 9A shows the screen of the virtual engine tachometer 31D in an idle state, and FIG. 9B shows the screen of the virtual engine tachometer 31D in an over-rev state. In the fourth variation, numerical values indicating the magnitude of the virtual engine rotational speed are not displayed. Instead, the arcuate area combining the first colored area 314 and the second colored area 315 of the virtual engine tachometer 31 is divided into six colored areas 319*a*, 319*b*, 319*c*, 319*d*, 319*e*, and 319*f* of equal angular width, with a color gradient established between the areas from the low-speed range side to the high-speed range side. The driver can determine the magnitude of the virtual engine rotational speed based on the color of the area where the needle 310 is positioned.

6-2. Second Embodiment

Figure 10:
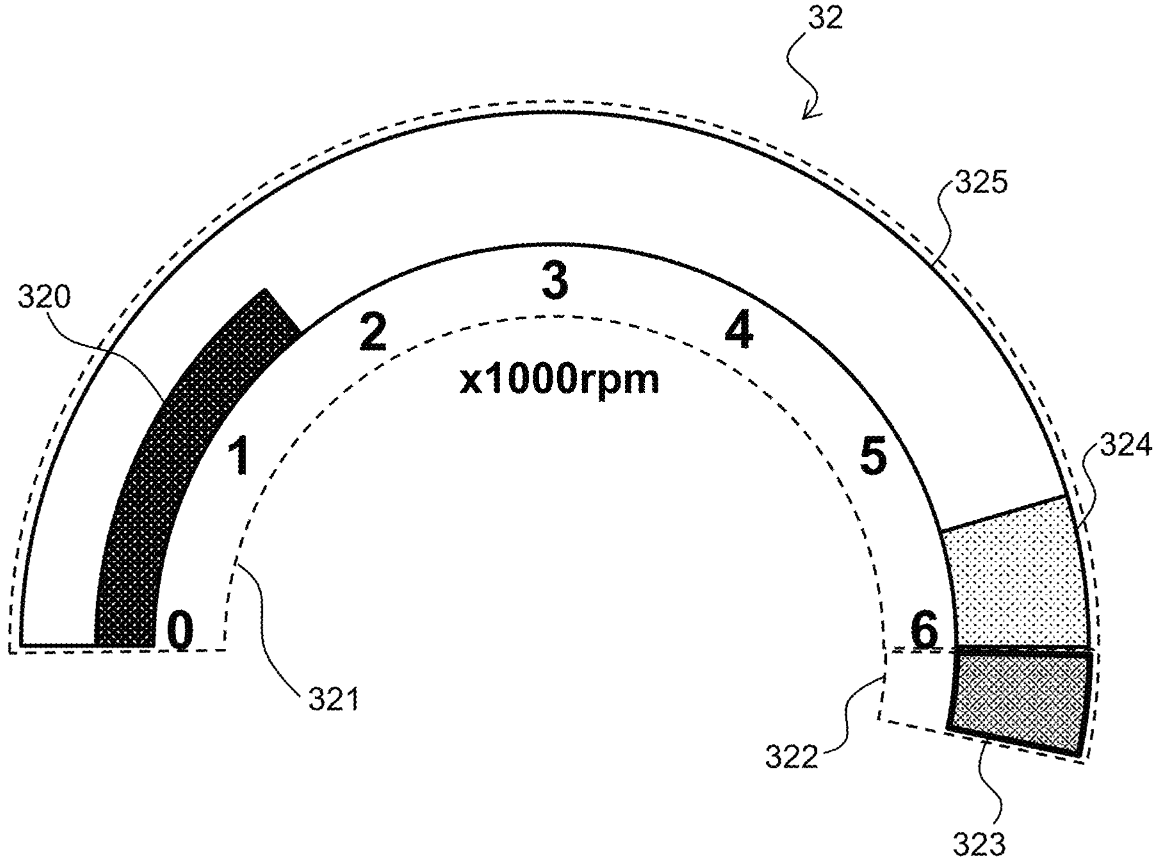
FIG. 10 is a diagram illustrating the screen configuration of the virtual engine tachometer according to the second embodiment.

FIG. 10 is a diagram illustrating the screen configuration of the virtual engine tachometer 32 according to the second embodiment. The virtual engine tachometer 32 has a bar 320 as an indicator that extends and contracts according to the magnitude of the virtual engine rotational speed. The extension and contraction of the bar 320 may be linear or curved, but in the example shown in FIG. 10, the bar 320 extends and contracts along an arc set within the screen.

The arc-shaped display area where bar 320 is shown can be divided into a first display area 321 and a second display area 322. The first display area 321 corresponds to the rotation range from 0 rpm to the redline rotational speed. Within the first display area 321, numerical values indicating the magnitude of rotational speed are displayed at regular intervals. In the example shown in FIG. 10, 6000 rpm is the redline rotational speed. The bar 320 extends from the base point corresponding to 0 rpm towards the redline rotational speed, with the length of the bar 320 representing the magnitude of the virtual engine rotational speed.

Two colored areas 324 and 325 are provided along the arc where the bar 320 extends and contracts in the first display area 321. The first colored area 324 corresponds to the red zone of the rotational speed that is virtually set in the virtual engine. The second colored area 325 corresponds to the engine rotational speed range up to just before the red zone. Similar to the virtual engine tachometer 31 of the first embodiment, the first colored area 324 and the second colored area 325 are visually distinguished from each other. However, the first colored area 324 and the second colored area 325 may be displayed as a single colored area combined.

The second display area 322 is provided adjacent to the first display area 321, with the redline rotational speed as a boundary. The second display area 322 corresponds to the over-rev zone of the rotational speed. Unlike the first display area 321, no numerical value indicating the magnitude of the rotational speed is displayed within the second display area 322. The second display area 322 includes a light emission area 323 as a third display area. The light emission area 323 is provided adjacent to the first colored area 324. The light emission area 323 is an area where emphasis display is performed according to the length of the bar 320. When the bar 320 is within the first display area 321, nothing is displayed in the light emission area 323. However, when the bar 320 reaches the second display area 322, the light emission area 323 brightly lights up, similar to the virtual engine tachometer 31 of the first embodiment.

Next, the screen transition of the virtual engine tachometer 32 having the above-described screen configuration will be described using FIGS. 11A, 11B, and 11C.

Figure 11A:
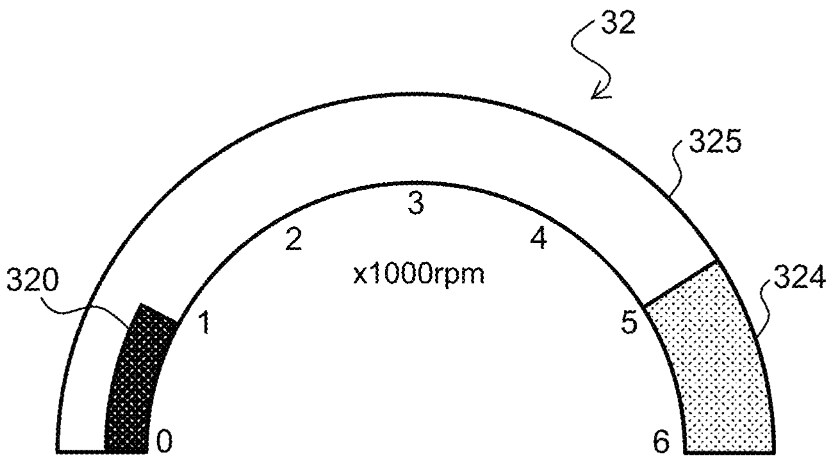
FIG. 11A is a diagram illustrating a screen of the virtual engine tachometer in an idle state according to the second embodiment.

FIG. 11A is a diagram illustrating the screen of the virtual engine tachometer 32 in an idle state. In an idle state, the length of the bar 320 is maintained near the idle rotational speed of the virtual engine. Subsequently, when the accelerator pedal 52 is depressed by the driver, the length of the bar 320 increases in accordance with the rise in the virtual engine rotational speed.

Figure 11B:
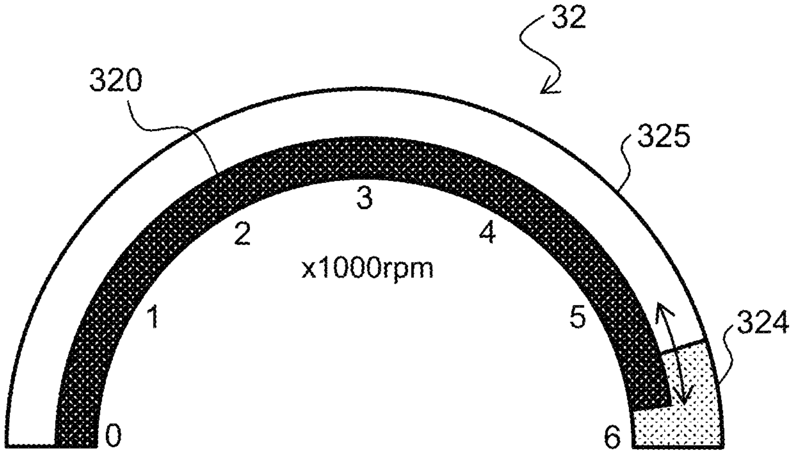
FIG. 11B is a diagram illustrating an example of image movement near the red zone of the virtual engine tachometer according to the second embodiment.

FIG. 11B is a diagram illustrating an example of image movement near the red zone of the virtual engine tachometer 32. When the accelerator pedal 52 is fully depressed by the driver, the vehicle control device 101 performs control so that the virtual engine rotational speed does not exceed the redline rotational speed. As a result of that control action, the length of the bar 320 expands and contracts such that its tip oscillates between the first colored area 324 and the second colored area 325.

Figure 11C:
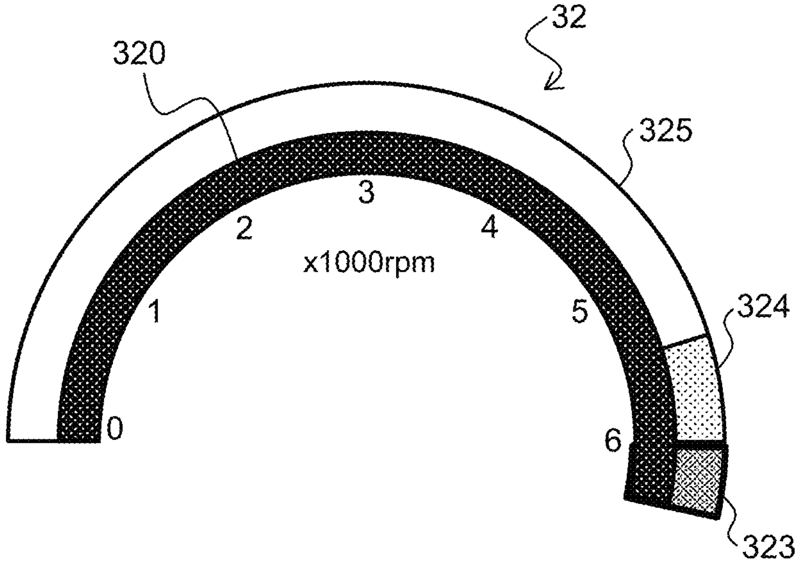
FIG. 11C is a diagram illustrating a screen of the virtual engine tachometer in an over-rev state according to the second embodiment.

FIG. 11C is a diagram illustrating the screen of the virtual engine tachometer 32 in an over-rev state. When the virtual engine rotational speed exceeds the redline rotational speed due to the driver's downshift operation, the bar 320 extends to a predetermined position beyond the redline rotational speed and is fixed at that position. At the same time, the light emission area 323, which had not been displayed on the screen until then, is illuminated.

By observing such movement of the bar 320 and the illumination of the light emission area 323, the driver can easily understand that the virtual engine rotational speed has entered the over-rev zone. Furthermore, by not displaying numerical values for the rotational speed in the over-rev zone, it is unnecessary to secure a wide display area corresponding to the over-rev zone, thereby conserving screen resources of the display screen. In other words, the virtual engine tachometer 32 enables the driver to clearly see the rotational state of the virtual engine while minimizing the waste of screen resources on the display screen.

The switching of numerical display settings according to the specifications of the virtual vehicle and the switching of numerical display settings according to the driving mode selected by the driver, which were explained in relation to the virtual engine tachometer 31 of the first embodiment, can also be applied to the virtual engine tachometer 32. Furthermore, similar to the various variations of the virtual engine tachometer 31 in the first embodiment, the screen configuration of the virtual engine tachometer 32 can also be modified.

6-3. Third Embodiment

Figure 12:
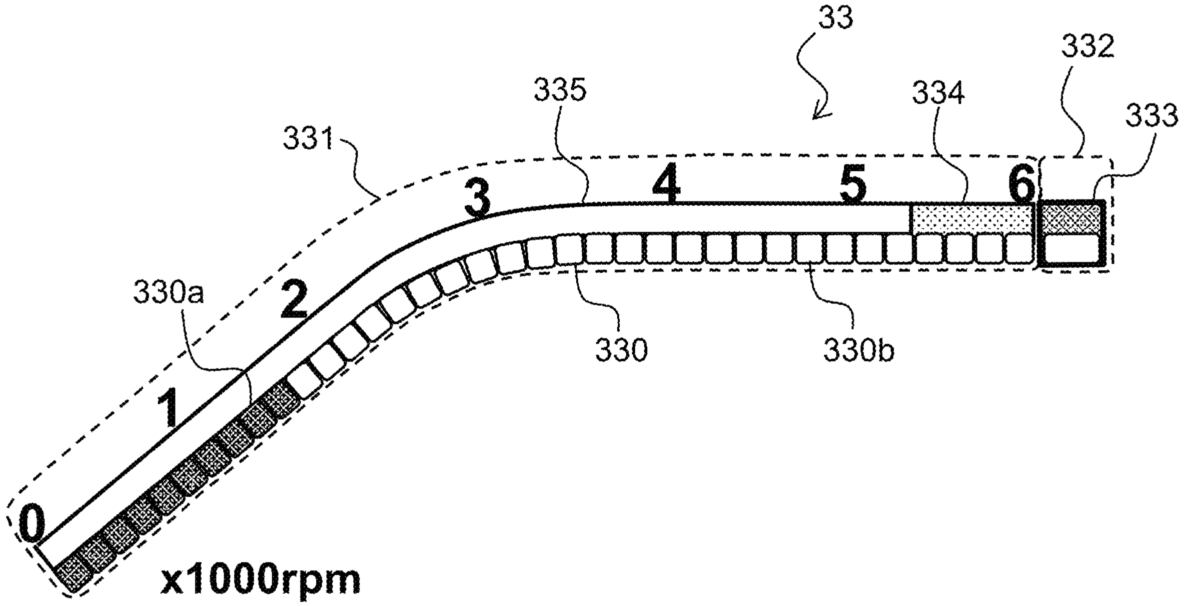
FIG. 12 is a diagram illustrating the screen configuration of the virtual engine tachometer according to the third embodiment.

FIG. 12 is a diagram illustrating the screen configuration of the virtual engine tachometer 33 according to the third embodiment. The virtual engine tachometer 33 has, as an indicator, multiple lamps 330 that light up sequentially according to the magnitude of the virtual engine rotational speed. The arrangement of lamps 330 may be linear or curved, but in the example shown in FIG. 10, the lamps 330 include portions arranged diagonally and portions arranged horizontally.

The display area where the lamps 330 are arranged can be divided into a first display area 331 and a second display area 332. The first display area 331 corresponds to the rotation range from 0 rpm to the redline rotational speed. Numerical values indicating the magnitude of rotational speed are displayed at regular intervals within the first display area 331. In the example shown in FIG. 12, 6000 rpm is the redline rotational speed. The lamps 330 are arranged in multiple units between a starting point corresponding to 0 rpm and an end point corresponding to the redline rotational speed. The lamps 330 include lit lamps 330*a* and unlit lamps 330*b*. When the virtual engine rotational speed is zero, all lamps 330 are unlit lamps 330*b*. Then, as the virtual engine rotational speed becomes greater than zero, the lamps 330 switch to lit lamps 330*a* starting from the base point side in order, and the magnitude of the virtual engine rotational speed is represented by the number of lit lamps 330*a*.

Two colored areas 334 and 335 are provided in the first display area 331 along the arrangement of lamps 330. The first colored area 334 corresponds to an area of the red zone for the rotational speed virtually set in the virtual engine. The second colored area 335 corresponds to the engine rotational speed range up to just before the red zone. Similar to the virtual engine tachometers 31 and 32 of the first and second embodiments, the first colored area 334 and the second colored area 335 are visually distinguished from each other. However, the first colored area 334 and the second colored area 335 may be displayed as a single colored area combined.

The second display area 332 is provided adjacent to the first display area 331, with the redline rotational speed as a boundary. The second display area 332 corresponds to the over-rev zone of the rotational speed. Unlike the first display area 331, the second display area 332 does not display numerical values indicating the magnitude of the rotational speed. The second display area 332 includes a light emission area 333 as a third display area. The light emission area 333 is provided adjacent to the first colored area 334. The light emission area 333 is an area where emphasis display is performed according to the illumination state of the lamps 330. When the lamp 330 in the second display area 332 is turned off, nothing is displayed in the light emission area 333. However, when the lamp 330 within the second display area 332 is illuminated, similar to the virtual engine tachometers 31 and 32 of the first and second embodiments, the light emission area 333 brightly lights up.

Next, the screen transition of the virtual engine tachometer 33 having the above-mentioned screen configuration will be described using FIGS. 13A, 13B, and 13C.

Figure 13A:
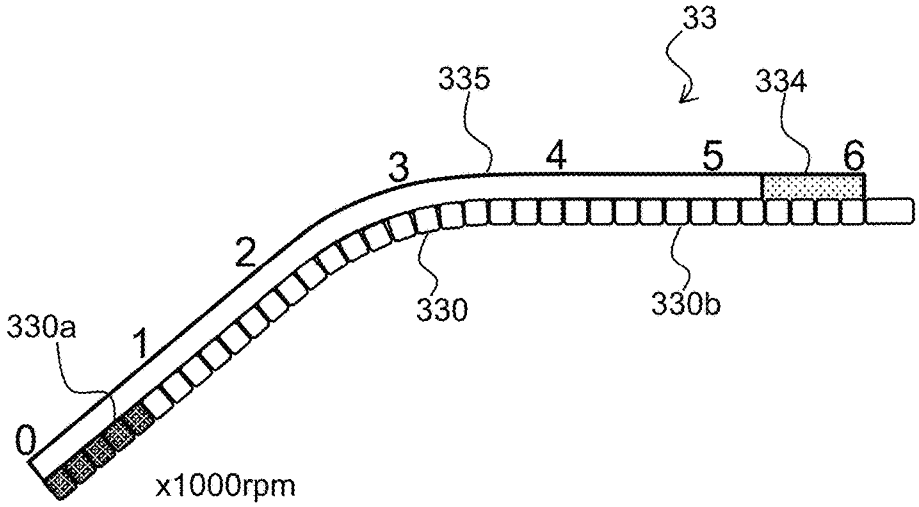
FIG. 13A is a diagram illustrating a screen of the virtual engine tachometer in an idle state according to the third embodiment.

FIG. 13A is a diagram illustrating the screen of the virtual engine tachometer 33 in an idle state. In an idle state, the number of lit lamps 330*a* is maintained near the idle rotational speed of the virtual engine. Subsequently, when the accelerator pedal 52 is pressed by the driver, the number of lit lamps 330*a* also increases in accordance with the rise in the virtual engine rotational speed. Unlike the virtual engine tachometers 31 and 32 in the first and second embodiments, the movement of the indicator consisting of lamps 310 is discrete in response to changes in the virtual engine rotational speed.

Figure 13B:
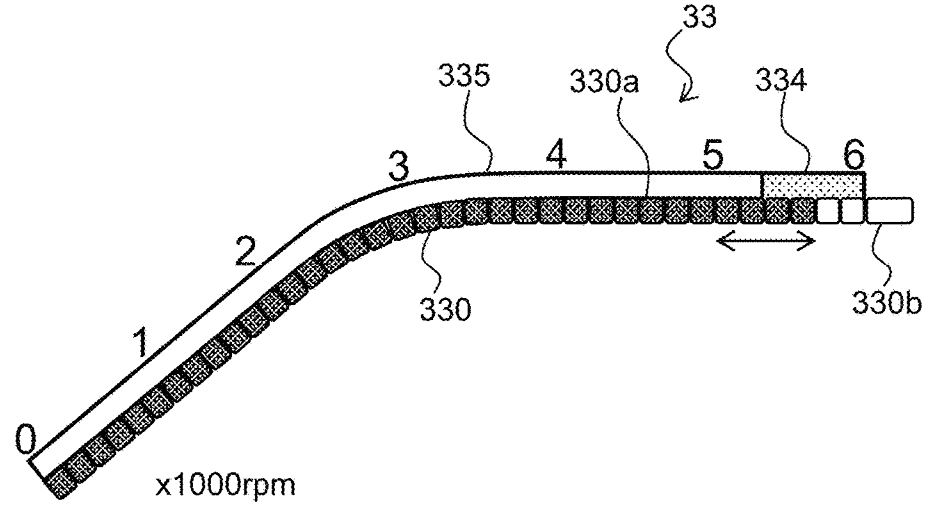
FIG. 13B is a diagram illustrating an example of the image movement near the red zone of the virtual engine tachometer according to the third embodiment.

FIG. 13B is a diagram illustrating an example of image movement near the red zone of the virtual engine tachometer 33. When the accelerator pedal 52 is fully depressed by the driver, the vehicle control device 101 performs control so that the virtual engine rotational speed does not exceed the redline rotational speed. As a result of that control action, the number of lit lamps 330*a* increases and decreases as the lamps 330 repeatedly switch between on and off states between the first colored area 314 and the second colored area 315.

Figure 13C:
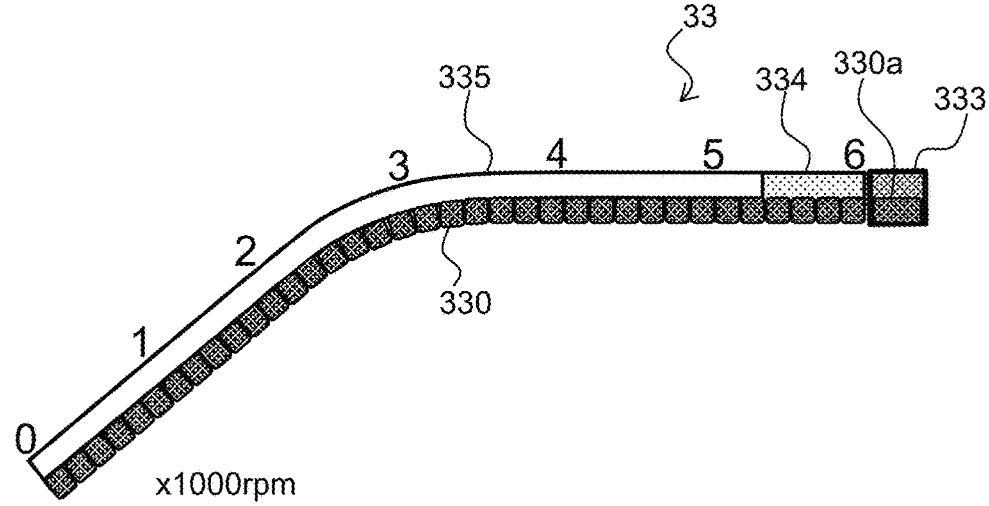
FIG. 13C is a diagram illustrating a screen of the virtual engine tachometer in an over-rev state according to the third embodiment.

FIG. 13C is a diagram illustrating the screen of the virtual engine tachometer 33 in an over-rev state. When the virtual engine rotational speed exceeds the redline rotational speed due to the driver's downshift operation, all lamps 330, including the over-rev zone (second display area 332 in FIG. 12), switch to lit lamps 330*a*. Simultaneously, the light emission area 333, which had not been displayed on the screen until now, is illuminated.

By seeing the change in the number of lit lamps 330 and the illumination of the light emission area 333, the driver can easily understand that the virtual engine rotational speed has entered the over-rev zone. Furthermore, by not displaying numerical values for the rotational speed in the over-rev zone, it is unnecessary to secure a wide display area corresponding to the over-rev zone, thereby conserving screen resources of the display screen. In other words, the virtual engine tachometer 33 allows the driver to easily understand the rotational state of the virtual engine while minimizing waste of screen resources on the display screen.

The switching of numerical display settings according to virtual vehicle specifications and the switching of numerical display settings according to the driving mode selected by the driver, as described for the virtual engine tachometer 31 in the first embodiment, can also be applied to the virtual engine tachometer 33. Furthermore, similarly to the various variations of the virtual engine tachometer 31 in the first embodiment, the screen configuration of the virtual engine tachometer 33 can also be modified.

7. Variations of Vehicle

In the vehicle 100 shown in FIG. 1, a virtual engine, virtual clutch, and virtual manual transmission were realized through torque control of the electric motor, reproducing the behavior of a manual transmission engine vehicle in an electric vehicle. However, reproducing the behavior of the manual transmission engine vehicle is also possible in an electric vehicle where an electric motor is combined with an actual manual transmission.

Figure 14:
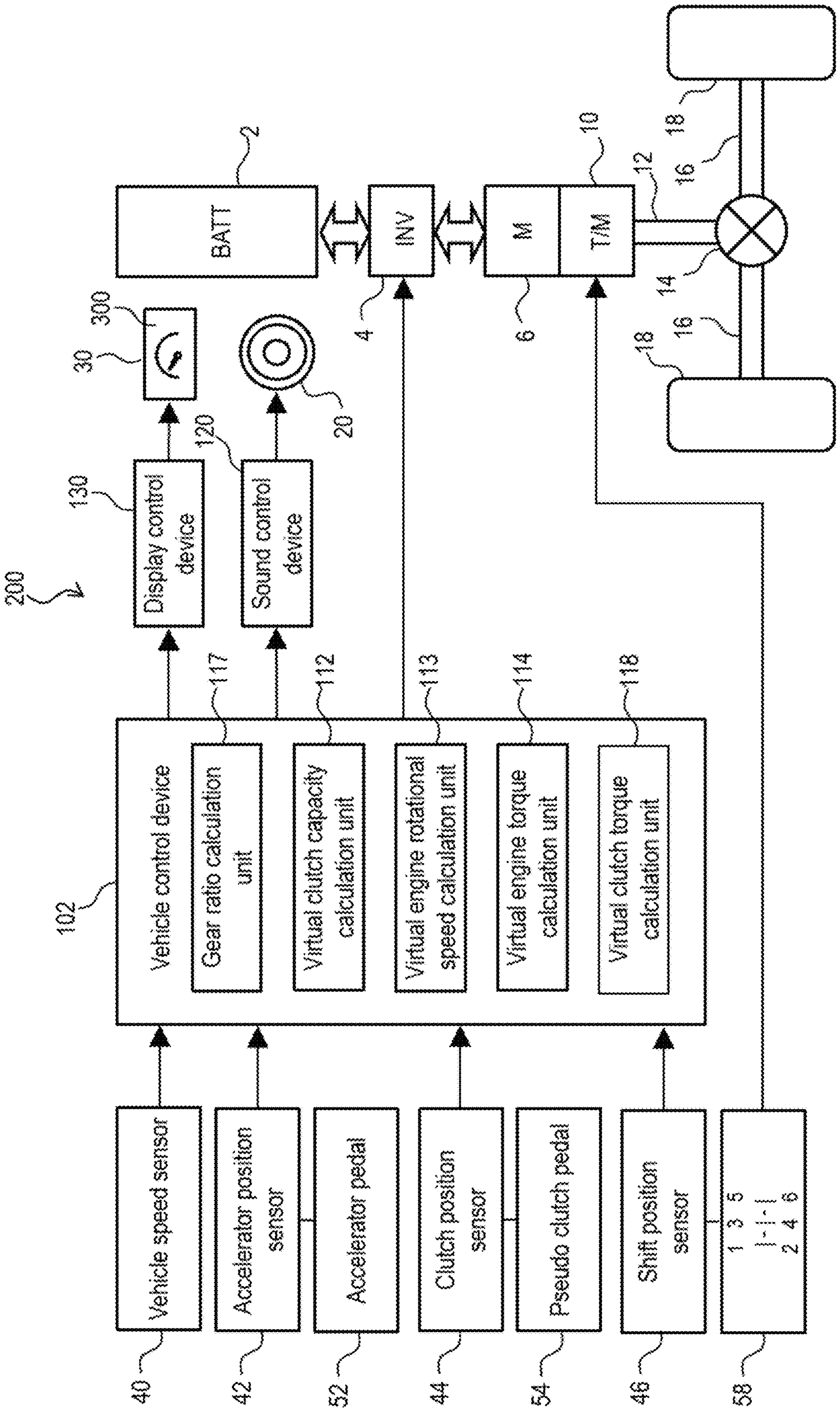
FIG. 14 is a diagram illustrating the configuration of a variation of the electric vehicle according to the present disclosure.

FIG. 14 is a schematic diagram illustrating the configuration of a vehicle 200 as a variation of the vehicle 100. In FIG. 14, elements common to the vehicle 100 are denoted by the same reference numerals. The vehicle 200 is a battery electric vehicle that travels by controlling the inverter 4 to supply the electric motor 6 with electric energy stored in the battery 2 and driving the drive wheels 18 by the electric motor 6. The vehicle 200 is equipped with a manual transmission (T/M) 10. The output shaft of the electric motor 6 is connected to the manual transmission 10. The manual transmission 10 is a multi-speed transmission with multiple switchable gear stages. The switching between multiple gear stages of the manual transmission 10 is performed by manual operation of the shifter 58 by the driver. The shifter 58 is an H-pattern shifter, which is an alternate-type shifter, and the shift lever can be moved along an H-shaped gate. The shifter 58 may be mechanically connected to the manual transmission 10, or it may be connected to the manual transmission 10 by wire. The manual transmission 10 is connected to the differential gear 14 by the propeller shaft 12.

The vehicle control device 102 equipped in the vehicle 200 comprises a transmission ratio calculation unit 117, a virtual clutch capacity calculation unit 112, a virtual engine rotational speed calculation unit 113, a virtual engine torque calculation unit 114, and a virtual clutch torque calculation unit 118. These calculation units are virtually implemented by the processor or group of processors executing programs stored in the memory of the control device 102. Among these, the virtual clutch capacity calculation unit 112, virtual engine rotational speed calculation unit 113, and virtual engine torque calculation unit 114 are the same as those related to the vehicle 100, so detailed explanations of these will be omitted.

The gear ratio calculation unit 117 acquires the signal from the shift position sensor 46. The shift position of the shifter 58 is obtained from the signal of the shift position sensor 46. The gear ratio of the manual transmission 10 is mechanically and uniquely determined for each shift position. The gear ratio calculation unit 117 calculates the gear ratio corresponding to the current shift position using a pre-prepared correspondence table. The virtual engine rotational speed calculation unit 113 uses the actual transmission ratio of the manual transmission 10 calculated by the transmission ratio calculation unit 117 to calculate the virtual engine rotational speed.

The virtual clutch torque calculation unit 118 calculates the virtual clutch torque using the virtual engine torque calculated by the virtual engine torque calculation unit 114 and the virtual clutch capacity calculated by the virtual clutch capacity calculation unit 112. When the virtual engine torque is smaller than the virtual clutch capacity, the virtual clutch torque calculation unit 118 outputs the virtual engine torque as the virtual clutch torque. On the other hand, when the virtual engine torque is greater than the virtual clutch capacity, the virtual clutch torque calculation unit 118 outputs a virtual clutch torque limited by the virtual clutch capacity. The control device 102 controls the inverter 4 to change the torque output by the electric motor 6 according to the virtual clutch torque.

Figure 15:
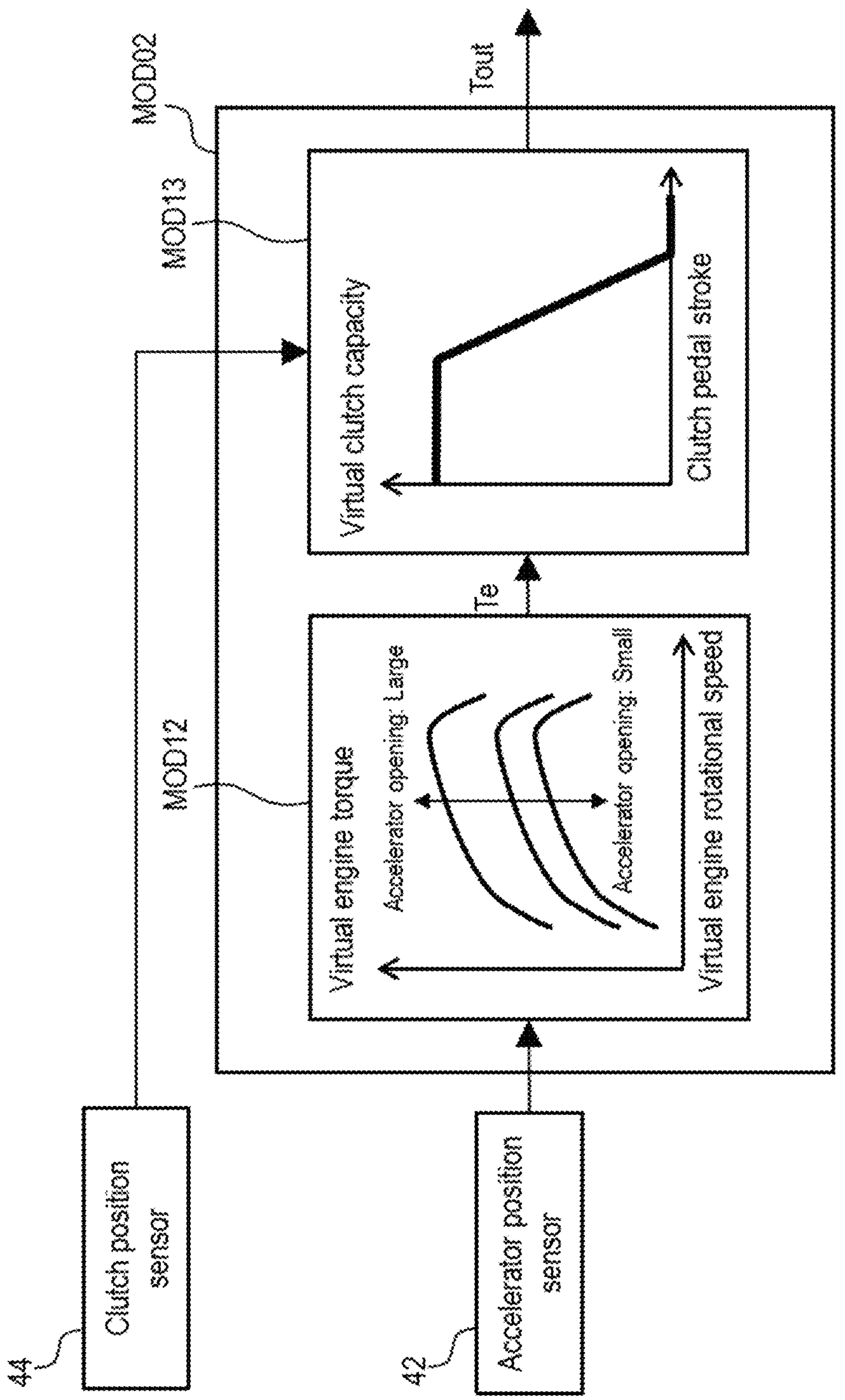
FIG. 15 is a diagram illustrating a vehicle model used in the control device for the electric vehicle shown in FIG. 14.

The vehicle control device 102 uses the vehicle model MOD02 shown in FIG. 15. The vehicle model MOD02 is composed of an engine model MOD12 and a clutch model MOD13. The control device 102 causes the electric motor 6 to output a virtual clutch torque Tout calculated by the clutch model MOD13. The manual transmission 10 amplifies the virtual clutch torque Tout input from the electric motor 6 according to the gear ratio. The engine model MOD12 and clutch model MOD13 are the same as those related to the vehicle model MOD01 used by the vehicle control device 101, so detailed explanations of these will be omitted.

8. Others

The technique for displaying the virtual engine rotational speed used in the electric vehicle of the present disclosure is not limited to the battery electric vehicle (BEV), and can be widely applied to any electric vehicle as long as the electric vehicle can change the torque output by the electric motor so as to simulate the rotational speed-torque characteristic of the virtual engine with respect to the operation input from the driver. For example, the technique of displaying the virtual engine rotational speed according to the present disclosure is applicable to a hybrid electric vehicle (HEV) or a plug-in hybrid electric vehicle (PHEV) having a mode in which the vehicle travels only by the driving force of the electric motor. The technique of displaying the virtual engine rotational speed according to the present disclosure is also applicable to a fuel cell electric vehicle (FCEV) that supplies electric energy generated by a fuel cell to the electric motor.

What is claimed is:

1. An electric vehicle adapted to change a torque output by an electric motor to simulate a rotational speed-torque characteristic of a virtual rotating machine in response to an operation input by a driver, comprising:
- a display device configured to display information to be given to the driver; and
- a control device configured to control a display screen of the display device,
- wherein the control device is configured to:
  - display an indicator representing a virtual rotational speed of the virtual rotating machine on the display screen,
  - in a rotational speed range below a redline rotational speed of the virtual rotating machine, move the indicator continuously or discretely within a first display area of the display screen according to a magnitude of the virtual rotational speed, and
  - in a rotational speed range higher than the redline rotational speed, move the indicator to a second display area outside the first display area, and limit a movement of the indicator within the second display area regardless of the magnitude of the virtual rotational speed.

2. The electric vehicle according to claim 1, wherein the second display area is adjacent to the first display area, and a boundary between the second display area and the first display area corresponds to the redline rotational speed.

3. The electric vehicle according to claim 1, wherein
- the first display area includes an area corresponding to a red zone of the virtual rotational speed, and
- the area corresponding to the red zone is visually distinguished from other areas of the first display area.

4. The electric vehicle according to claim 1, wherein the indicator is a needle that rotates around a predetermined rotation center according to the magnitude of the virtual rotational speed.

5. The electric vehicle according to claim 1, wherein the indicator is a bar that expands or contracts linearly or curvilinearly according to the magnitude of the virtual rotational speed.

6. The electric vehicle according to claim 1, wherein the indicator is a plurality of lamps that light up sequentially according to the magnitude of the virtual rotational speed.

7. The electric vehicle according to claim 1, wherein
- the first display area includes a numerical display indicating the magnitude of the virtual rotational speed, and
- the second display area does not include the numerical display.

8. The electric vehicle according to claim 7, wherein
- the control device is configured to:
  - acquire specification information related to a specification of a virtual vehicle including the virtual rotating machine, and
  - change a setting of the numerical display according to the specification information.

9. The electric vehicle according to claim 7, wherein
- the control device is configured to:
  - acquire a driving mode selected by the driver, and
  - change a setting of the numerical display according to the driving mode.

10. The electric vehicle according to claim 1, wherein
- the first display area includes areas displayed in a plurality of colors divided for each rotational speed range of the virtual rotational speed, and
- the second display area includes an area displayed in a single color.

11. The electric vehicle according to claim 1, wherein the control device is configured to emphasize a third display area of the display screen in the rotational speed range higher than the redline rotational speed.

12. The electric vehicle according to claim 11, wherein the second display area includes the third display area.

13. The electric vehicle according to claim 11, wherein the third display area is provided outside the first display area.

14. The electric vehicle according to claim 11, wherein the third display area is provided within the first display area.

15. The electric vehicle according to claim 11, wherein the third display area is an icon.

* * * * *